United States Patent [19]

Lowry, III

[11] Patent Number: 4,660,493

[45] Date of Patent: Apr. 28, 1987

[54] DUAL DIRECTIONAL CAM CLEAT

[76] Inventor: John A. Lowry, III, 124 Arden, Columbus, Ohio 43214

[21] Appl. No.: 764,119

[22] Filed: Aug. 9, 1985

[51] Int. Cl.$^4$ ............................................. B63B 21/08
[52] U.S. Cl. .................................. 114/199; 114/218; 24/134 R
[58] Field of Search ............. 114/199, 218; 24/134 R, 24/134 KA, 132 R, 134 KB, 170, 498

[56] References Cited

U.S. PATENT DOCUMENTS

| 81,311 | 8/1968 | Way | 24/134 R |
|---|---|---|---|
| 1,243,103 | 10/1917 | Richardson | 24/134 R |
| 2,608,174 | 8/1952 | Sponenburg | 24/134 R |
| 2,836,870 | 6/1958 | Shea | 24/134 R |
| 3,091,207 | 5/1963 | Songer | 114/199 |
| 3,750,611 | 8/1971 | Field | 114/218 |
| 4,160,541 | 7/1979 | Harken et al. | 114/218 X |
| 4,425,862 | 1/1984 | Hirsch et al. | 114/199 |

FOREIGN PATENT DOCUMENTS 649919 2/1951 United Kingdom ............. 24/134 R

Primary Examiner—Sherman D. Basinger
Assistant Examiner—Paul E. Salmon

[57] ABSTRACT

A dual position cam cleat for use principally on small sailing boats and crafts for maintaining the sail ropes taut. The dual position cam cleat comprises a pair of serrated jaws to grip the rope in either direction. The dual jaws are positioned side-by-side and displaced approximately 90° to 120° apart and mutually pivotable about a common point to either direction. The jaws in a crossdirection comprise a serrated and a non-serrated portion. The non-serrated and smooth portion permits rope slippage for adjusting the tension without movement of the cam cleat. The dual cam cleat is shifted from the one gripping jaw to the other by the sailor vertically jerking the line. A spring means connected between the pivot point and the support member maintains the one jaw in an active position and the other jaw in a passive condition and offers a "crisp" toggling or snapping action when reversing the tension members. A swivel base permits the entire dual structure to be swiveled to any angle within 180° and thereby maintain a constant in-line direction. The dual position cam cleat of the invention provides the unique capability of a continuous line operating a jib or spinnaker leading through only one cam cleat. The necessity of having a cam cleat for each direction has been obviated.

4 Claims, 7 Drawing Figures

DUAL DIRECTIONAL CAM CLEAT

BACKGROUND

In the sailing craft art, cam cleats for maintaining the sail lines or rope taut are well known and commercially in use. Although there are variations in structure, each of the prior art cam cleats are unidirectional relative to the gripping jaws. Accordingly, in use on a sailing craft, to control the jib sails, a first and second cam cleat grips the line to maintain the line taut in the opposite direction. The one cam cleat is operably independant of the other; and the one must be disengaged prior to the other coming into use.

In addition to the necessity of purchasing two cam cleats, there are other attendant disadvantages with the prior art cam cleats. To maintain the rope/line taut in a given direction opposite from a prior direction, the rope must be relieved from the one cam cleat and then forced to grasp the jaws of the other cam cleat. The sailors motion is cumbersome and in some instances the sailor may be shifting continuously from one cam cleat to the other.

Most cam cleats are fixed in position to a single direction and the opposite cam cleat is fixed in a single in-line direction. With the sail going from one position to another, the angle of the rope/line will be at some intermediate angle relative to the cam cleat. Certain prior art cam cleats are pivotally mounted on their end opposite the gripping jaws. Although the pivot does permit the movement of the line to some intermediate angle, the disengaging of the one cleat to switch to the opposite cam cleat is further complicated and made cumbersome. The cost of the cam cleat pivot is also doubled.

With the use of an endless rope/line from one clew of the spinnaker to the other, the prior art does not provide a convenient method of cleating the end opposite the spinnaker pole.

SUMMARY OF THE INVENTION

The present invention relates to a cam cleat for maintaining a rope/line taut on a sailing craft. In its preferred embodiment, the cam cleat is a dual direction cam cleat. That is, the cam cleat may be readily repositioned with the direction of the line to maintain the line taut irrespective of its direction.

The structure comprises a pair of gripping jaws for a first and second major direction positioned on a swivel base to provide a 360° function.

The dual jaws are postiioned side-by-side with the supporting structure at an angle in the order of 120°. The opposite end of the supporting structure is pivoted at a mutual point. Upon the one jaw engaging the rope/line, the other jaw is disengaged.

Each of the pair of jaws in their crossection comprises a portion of serrations and a portion with a smoooth surface. In operation, the line fed through the cam cleat slips past either the smooth or serrated portion of the jaw. Upon the line/rope attaining the desired tension, the rope/line is engaged by the serrated portion of the jaw, thereby causing the serrated portion of the jaw to maintain the rope/line taut.

On occasion in sailing craft, the rope/line may be either too taut or insufficiently taut. Again, the rope/line is jerked sideways by the sailor to the smooth portion of the jaw; and in this position the line/rope is readjusted to the proper tension. The rope/line is then jerked by the sailor back to the serrated portion of the jaws for maintaining the tautness of the rope/line.

When it is desired to shift the sail, such as a jib sail, from one position to the opposite position, the rope/line is jerked by the sailor in a vertical direction and the dual jaw cam cleat crisply toggles to the opposite jaw to maintain the rope/line taut in the opposite direction.

As commonly known, the sail upon which the line is attached is very rarely in a single direction or a pair of oppositely positioned directions. Accordingly, the preferred embodiment of the present invention is positioned on a swivel base. In this way, each of the dual direction cam cleat jaws will maintain the line/rope taut over a range of 180° in an in-line direction.

OBJECTS

It is accordingly a principal object of the present invention to provide a new and improved cam cleat for maintaining a rope/line taut on a sailing craft irrespective of the position of the sail.

Another object of the present invention is to maintain the rope/line on a sailing craft taut in all directions with a single structure.

A further object of the present invention is to provide a dual position cam cleat for maintaining a rope/line taut over an entire 360° range.

Still another object of the present invention is to provide a dual position cam cleat that is simple in structure, relatively inexpensive, and sufficiently rugged for long life usage.

Other objects and features will become apparent from the following detailed description when taken in conjunction with the drawings in which:

DETAILED DESCRIPTION OF THE PREFERRED EMBODIMENT OF THE INVENTION

Figure 1:
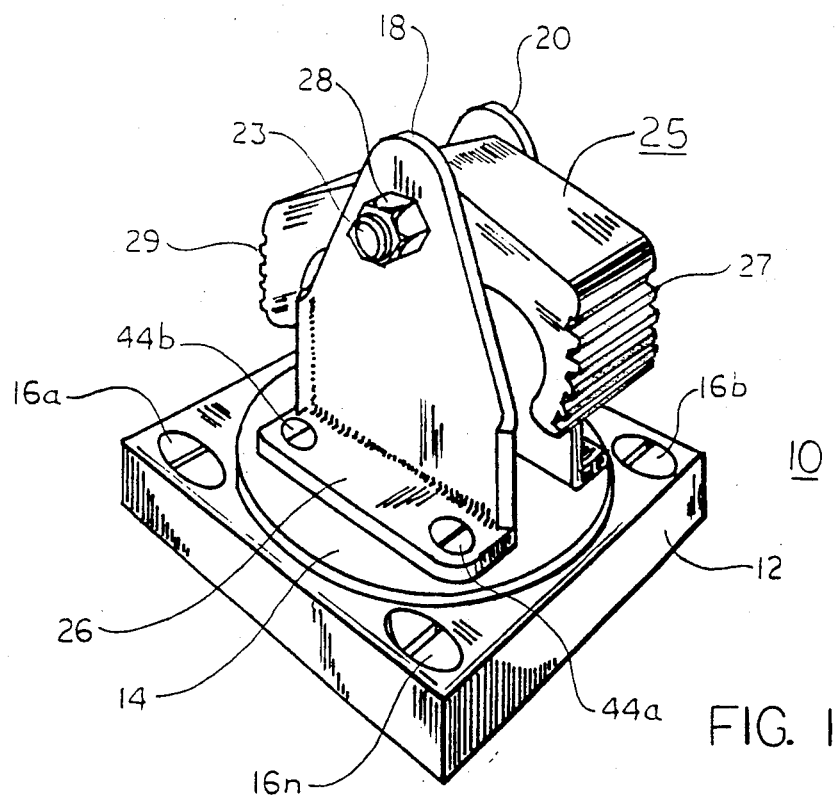
FIG. 1 is an overall illustration in perspective of the preferred embodiment of the present invention showing the dual jaws of the cam cleat positioned on a swivel base.

With reference now to the drawings, and particularly to the overall configuration of FIG. 1, there is illustrated the present invention in its preferred embodiment. The structure comprises the dual cam cleat 25 having a pair of gripping jaws 27 and 29, pivotal on a mutual pivot point 23, having supporting structure 18-20, mounted on a swivel base 12.

Figure 2:
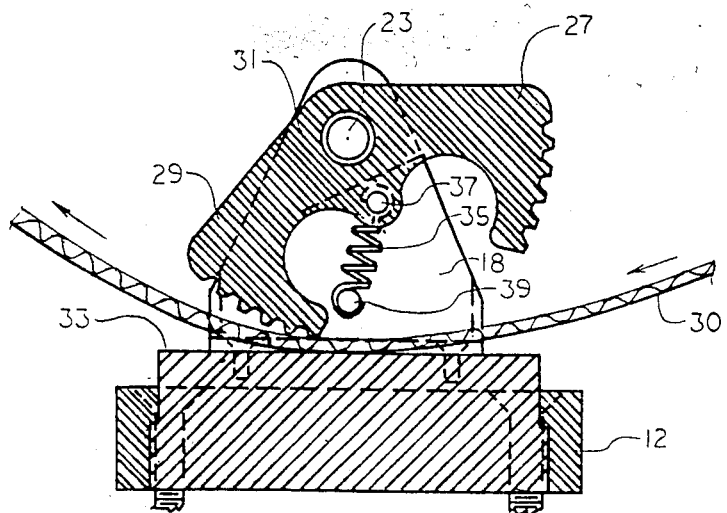
FIG. 2 is a side view of the embodiment of FIG. 1 illustrating the serrated jaw gripping the rope/line.

With continued reference to FIG. 1 and also with specific reference to FIG. 2, the structural features reside primarily in the dual jaw 27-29 cam cleat 25. The overall structure comprises a pair of jaws 27 and 29 displaced on either end of the support 31. The dual jaws 27 and 29 are not linearly displaced relative to one another; that is, the support 31 is less than 180° and may be in the order of 120°.

The curvature distinction maintains the disengaged jaw below the horizontal position, as more fully set forth below. The structure 31 is supported at the pivotal point 23, to permit the gripping portion of the jaws 27 or 29 to be moved vertically up and down in engagement of the one jaw with the rope/line 30 and then in engagement of the rope/line 30 with the other.

The extreme ends of the jaws 27 and 29 comprise serrated surfaces 42 for gripping and retaining taut the rope/line 30. Again, as more fully described below, the extreme end of the jaws 27 and 29 also comprises a smooth surface 40 for slippage of the rope/line.

The dual structure cleat 25 is supported by a pair of upright arms 18 and 20; and which upright arms 18 and 20 are mounted on the base 12, such as by screws 44a xxx 44n. As shown in FIG. 1, the dual structure cam cleat 25 is pivotally secured to the pair of upright arms 18 and 20 by way of the bolt and nut 28. The base 12 is secured to the boat or sailing craft in a conventional manner, by way of screws 16a xxx 16n such as: directly to the craft.

The base 12 may further comprise a rotational plate 14, rotationally connected to the lower portion of the base 12. The rotational plate 14 permits the dual cam cleat to be rotated 360° without engagement of the line; or to be rotated 180° with engagement of the line 30. The rotational plate 14 is a conventional swivel and per se does not form a part of the invention.

With specific reference to FIG. 2, it can be seen that when the jaw 29 is in engagement with the rope/line 30, the jaw 27 is disengaged and provides no function. The extreme end of the serrations on the jaws 27 and 29, as shown by jaw 29, is positioned a distance above the upper surface 33 of the supporting base 12, just slightly less than the diameter of the rope/line 30. In this way, the serrations grip the line and in preventing the line from further movement retains the line/rope 30 taut.

The line 30 is initially positioned along the upper surface 33 of the base 12. Depending on the direction of the line to be kept taut determines which jaw 27 or 29 is to engage the line 30. As shown in FIG. 2, the line 30 is initially moving from the right to the left. When the proper tension is reached, the jaw 29 serrations 42 will engage the line 30 and bind the line 30 with the upper surface 33 of the base 12 to maintain the proper tension.

The spring 35 is mounted at 37 adjacent the pivot point 23 and at a lower position 39 on the upright supporting structure 18. This assures that one jaw or the other, depending on the direction of the line 30, is kept in engagement with the line 30. The line 30 is kept taut by a crisp toggling action once the point 37 passes either side of a line of force between points 23 and 39.

Figure 3:
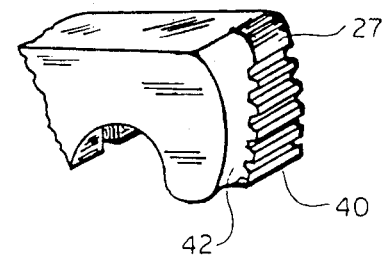
FIG. 3 is a partial view of the gripping jaw illustrating a serrated and a smooth integral surface.
Figure 7:
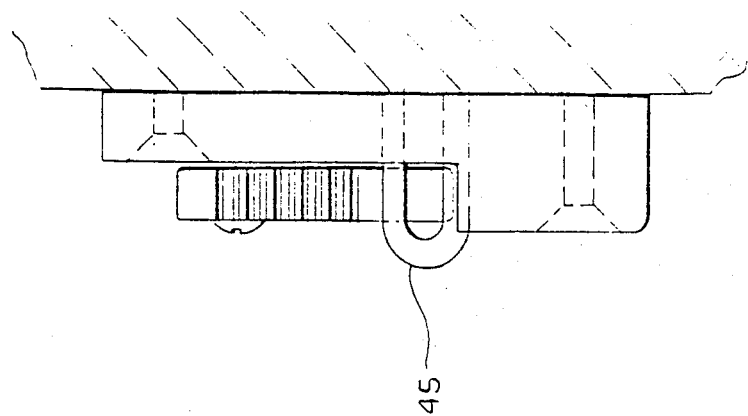
FIG. 7 is a side view of the embodiment shown in FIG. 6

With reference now to FIG. 3, there is illustrated the extreme end of the jaws 27; the other jaw 29 is identically constructed. It is to be noted that the serrations 42 do not extend accross the entire surface of the jaw. The right portion 40, or could be the opposite portion, of the extreme end of the jaw is smooth.

The surface of the jaw thatis smooth 40, has the same outside diameter as the extreme points of the serrations 42. That is, the entire outer-surface of the jaws 27 and 29 is of one equal radius to permit the line 30 to move from the one position to the other without impediment or obstruction. The serrations are not removed from the end of the jaws, a portion of the surface includes the serrations.

With an understanding of the structural arrangement of the components, the function and operation of the dual directional cam cleat may now be described. With the overall structure permanently mounted to the sailing craft, the line 30 is fed between the end of the one of the jaws 27 or 29 and the upper surface of the base support 12. The dual directional cam cleat is flipped by hand or by lifting the rope vertically, in a direction to accomodate the desired end of the line to be kept taut; for illustration, as shown in FIG. 2.

The line is permitted to be extended, that is, to pass over the smooth or serrated portions of the jaw 29 until the desired tension on the line is achieved. The line 30 is manipulated horizontally to engage the serrations 42 on the extreme end of the jaw. Much in the same manner or reverse manner, the slack or tension of the line 30 may be adjusted without disengaging the cam cleat.

The spring 35 provides a force action of sufficient pressure on the jaw engaging the line 30; but yet, the spring does not prevent the shifting from the one jaw to the other.

When the sail is shifted from the one position to the relative opposite position, the tension of the line is similarly shifted from the one direction to the opposite direction. The prior art pair of cam cleats, the one for the one direction and the other for the opposite direction, is obviated by the dual directional cleat of the preferred embodiment.

The direction of the line 30 is rarely in-line with the mounting of the cam cleat; accordingly, the line 30 is at some other degree in direction. The preferred embodiment contains the line 30 at all angles in direction by the swivel base 14. The overall structure 25 is rotationally mounted to the base and rotates with the direction of the line tension.

To shift from the one direction to another overall direction, the line 30 is jerked in a vertical direction while continually being retained by member 39. The entire cam cleat is shifted from the one jaw to the other. The spring 35 is relieved of its compression on the one jaw and placed on the other jaw in a toggling action. At that time the serrated portion of the jaw clamps the line in the opposite direction.

The rotational swivel base 14 permits the dual directional cam cleat to be rotated 360° without engagement of the line 30; or to be rotated 180° with engagement of the line 30.

Figure 5:
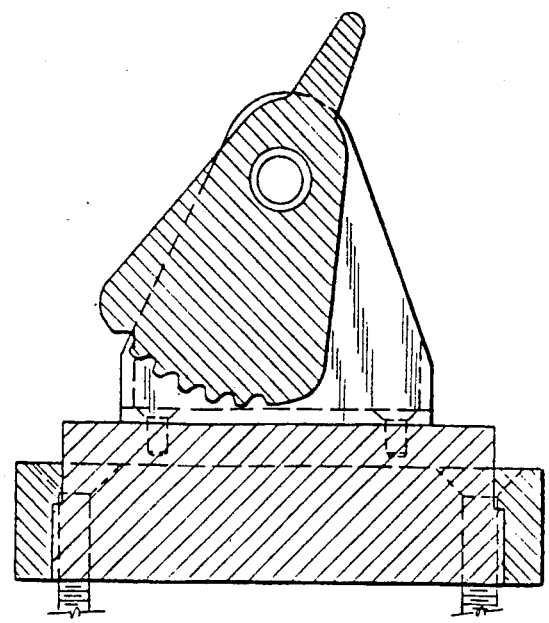
FIG. 5 is a side view of an alternative embodiment of a dual position cam cleat with a single grippping jaw.
Figure 4:
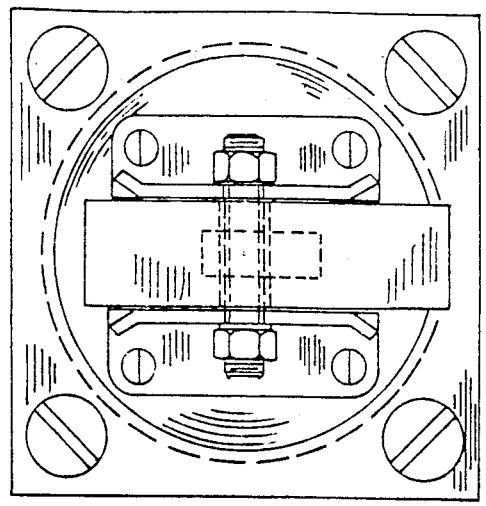
FIG. 4 is a top view of the swivel base supporting the dual position cam cleat of the present invention.

With reference to FIG. 5 there is illustrated an alternative embodiment to the present invention. In this embodiment, the dual directional cam cleat jaws are effectively combined into a single jaw and without a toggle spring. Thereafter, the structure is operable much in the same manner as aforesaid. Fundamentally, the structure of FIG. 5 comprises a pair of jaws one for either direction; the distinction is that the jaws are integrally formed.

Figure 6:
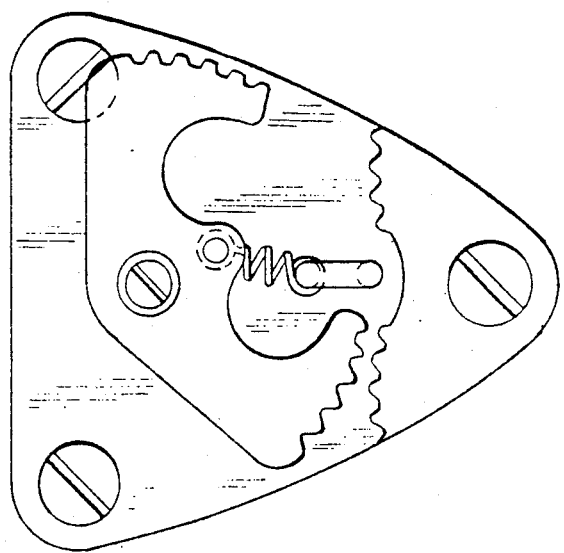
FIG. 6 is a top view of still another alternative embodiment employing a dual position cam cleat in a horizontal position to present a low profile arrangement.

In FIG. 6 there is illustrated still another alternative embodiment of the present invention for a dual directional cam cleat. The overall structure is mounted to the sailing craft in a horizontal position. This presents a low profile arrangement and less of an obstacle to the crew's performance and comfort. The smooth surface at the extremeties, as taught above in the verticle dual cam cleat, also has been obviated.

In operation of the dual cam cleat of FIG. 6, to adjust the tension on the line 30, the line 30 is lifted vertically from the serrated jaws while being retained in position by the eyelet 45. Upon achieving the porper tension, the line is forced downwardly into the serrations of the jaws.

Although certain and specific embodiments have been shown and described it is to be understood that departures and modifications may be had without departing from the true spirit and scope of the invention.

I claim:

1. A dual directional cam cleat for maintaining a line taut on a sailing craft, comprising:

a base, .

a pair of upright arms positioned on said base, a dual cam cleat support structure positioned between said upright arms including a gripping jaw positioned on each end thereof, said upright arms and said dual cam cleat support structure including an aperture at the uppermost part thereof for retaining a support pin for said dual cam cleat support structure and for permitting pivotal vertical movement of said gripping jaws thereon, the longitudinal axis between each of the ends of said dual support structure having said gripping jaws and said support pin being less than 180° relative to one another, a resilient member connected to said dual cam cleat support structure below said support pin and to a lower position on said arms to maintain a single one of said gripping jaws in a lowermost toggling position, said gripping jaws have a portion serrated for gripping said line and for maintaining the line taut, said base comprising a rotational platform, and means for securing said upright arms to said rotational platform to thereby permit the primary direction of each of said pair of jaws when engaging said line to be rotated 180°.

2. The dual directional cam cleat for maintaing a line taut as set forth in claim 1 wherein said resilient member comprises a toggle spring.

3. The dual directional cam cleat for maintaining a line taut as set forth in claim 1 further comprising:

said gripping jaws having a portion serrated for gripping said line and maintaining said line taut, and a smooth portion for permitting said line to pass through said structure for adjusting the tension thereon.

4. The dual directional cam cleat for maintaining a line taut as set forth in claim 1 wherein:

said dual cam cleat support structure is positioned horizontally on the sailing craft and further comprising an eyelet for retaining the line within or adjacent the gripping structure.

* * * * *